Jan. 1, 1963 W. VENUS 3,070,857
APPARATUS FOR PROVIDING VACUUM IN MOLDS
Filed Oct. 29, 1958 4 Sheets-Sheet 1

INVENTOR
Wilibald Venus

BY Michael S. Striker
ATTORNEY

Jan. 1, 1963   W. VENUS   3,070,857
APPARATUS FOR PROVIDING VACUUM IN MOLDS
Filed Oct. 29, 1958   4 Sheets-Sheet 2

INVENTOR.
Wilibald Venus
BY Michael S. Striker
Attorney

Jan. 1, 1963 W. VENUS 3,070,857
APPARATUS FOR PROVIDING VACUUM IN MOLDS
Filed Oct. 29, 1958 4 Sheets-Sheet 4
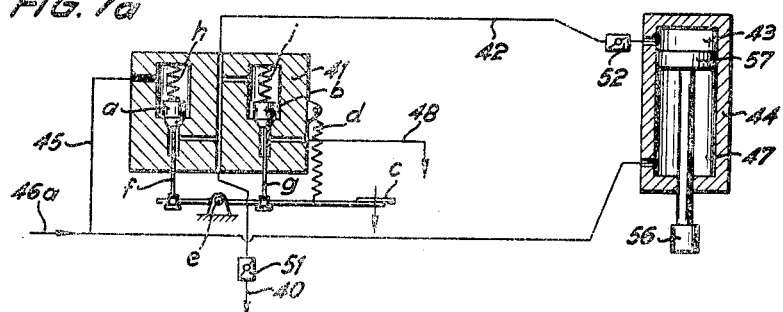
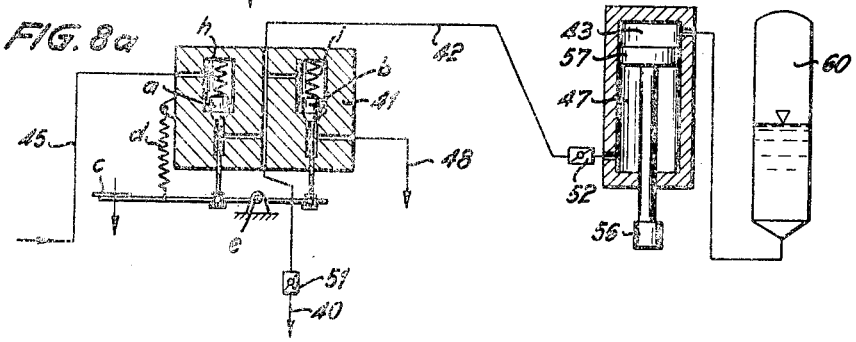
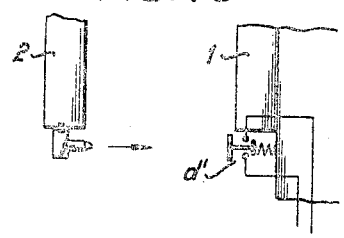
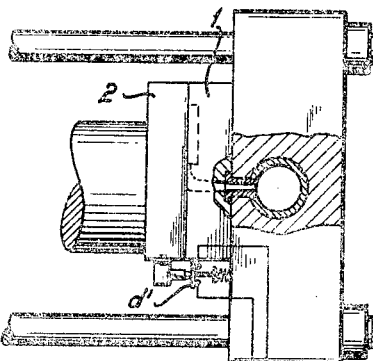
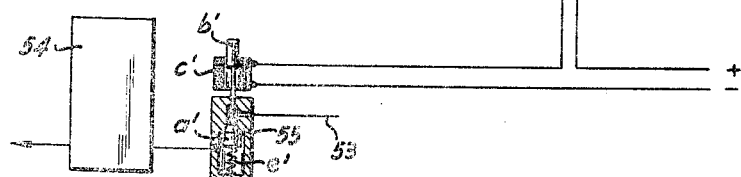
INVENTOR
Wilibald Venus
by

United States Patent Office 3,070,857
Patented Jan. 1, 1963

3,070,857
APPARATUS FOR PROVIDING VACUUM
IN MOLDS
Wilibald Venus, Plundter Platz 3, Munich 23, Germany
Filed Oct. 29, 1958, Ser. No. 770,458
Claims priority, application Germany Oct. 30, 1957
2 Claims. (Cl. 22—73)

The present invention relates to molding apparatus.

More particularly, the present invention relates to molding apparatus of the type used in die-casting, for example, where the mold cavity is required to be evacuated in order to guarantee that the molten material will completely fill the entire mold cavity and in order to guarantee that no gas bubbles will be entrapped in the casting.

At the present time it has not been possible to reconcile two conflicting requirements of a molding apparatus of this type. On the one hand it is required that the mold cavity be capable of being placed in free communication with a source of vacuum before the mold material is introduced into the cavity so as to guarantee the desired evacuation of the mold cavity, and on the other hand it is required that the mold material be easily removable from the mold cavity after the material has hardened and that none of the mold material remain in the evacuating passages to cause the latter to become stopped up so as to prevent further use of the mold. In order to satisfy the requirement of providing free communication between a mold cavity and a source of vacuum, the evacuating passage should be made as large as possible so as to provide as little friction as possible in the flow of air out of the interior of the mold cavity. However, where the evacuating passages are large enough in their cross section to guarantee efficient, easy evacuation of the mold cavity, the mold material can easily flow into the evacuating passages to make it difficult to remove the hardened mold material as well as to cause the evacuating passages to be stopped up so that the mold cannot be used again unless, of course, special and time consuming steps are taken in order to remove the mold material from the evacuating passage. On the other hand, where the evacuating passages are so constructed that the mold material cannot flow into the same, as for example when these passages are made of an extremely small cross section, then there is the difficulty of efficiently and easily evacuating the mold cavity, since these small passages provide a great resistance to the flow of gas therethrough and it is then only possible to evacuate the mold cavity in an extremely inefficient manner. The great resistance to the flow of air through extremely narrow evacuating passages results in considerable retarding of the flow of air so that the evacuation takes an undesirably long time and the output is greatly reduced. When it is remembered that in die-casting the molten mold material is introduced into the mold under pressure, then it can be appreciated that the cross section of flow of the gas out of the mold cavity must be maintained extremely small to prevent the molten metal or the like which is under pressure from entering into the evacuating passages.

It is accordingly a primary object of the present invention to provide a molding apparatus which reconciles the above conflicting requirements by making it possible on the one hand to quickly and easily evacuate the mold cavity with substantially no or very little resistance to the flow of air out of the mold cavity and by also making it possible to guarantee that the evacuating passage will not become stopped up and that the hardened mold material can be removed from the mold cavity without difficulty.

Another object of the present invention is to provide an apparatus of the above type which is made of simple and rugged parts and which is very reliable in operation.

A further object of the present invention is to provide an apparatus of the above type which is automatic with respect to the opening and closing of the communication between the mold cavity and a source of vacuum.

It is also an object of the present invention to provide a structure which can be used either with that type of molding apparatus where the molten metal is introduced into the mold when hydraulic pressure is applied to a hydraulic structure which controls the feeding of the molten metal into the mold cavity.

It is also an object of the present invention to provide a structure of the above type which can be used in that type of molding apparatus where the charging of the mold with molten metal is controlled by a hydraulic device which does not cause material to be charged into the mold when hydraulic pressure is applied to the hydraulic device.

With the above objects in view the present invention includes a molding apparatus in which a mold is formed with a mold cavity defined in part by inner surface portions of the mold. This mold is formed with a first passage which terminates at the inner surface portion of the mold and with a second passage which communicates with the first passage at a part thereof which is spaced from the inner surface portion of the mold. This second passage is adapted to be placed in communication with a source of vacuum so that the mold cavity can be evacuated through the first and second passages of the mold. A plunger is axially movable along the first passage of the mold between an open position where the plunger does not prevent communication between mold cavity and the second passage through the first passage and a closed position where an end portion of the plunger completely closes the first passage at the inner surface portion of the mold. When the plunger is in its closed position, its end portion is located out of the path of movement of the hardened mold material out of the mold cavity, so that the plunger does not in any way interfere with removal of the casting from the mold, and by closing the first passage with the plunger no mold material can flow into this first passage.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 9:
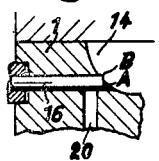
Figure 7:
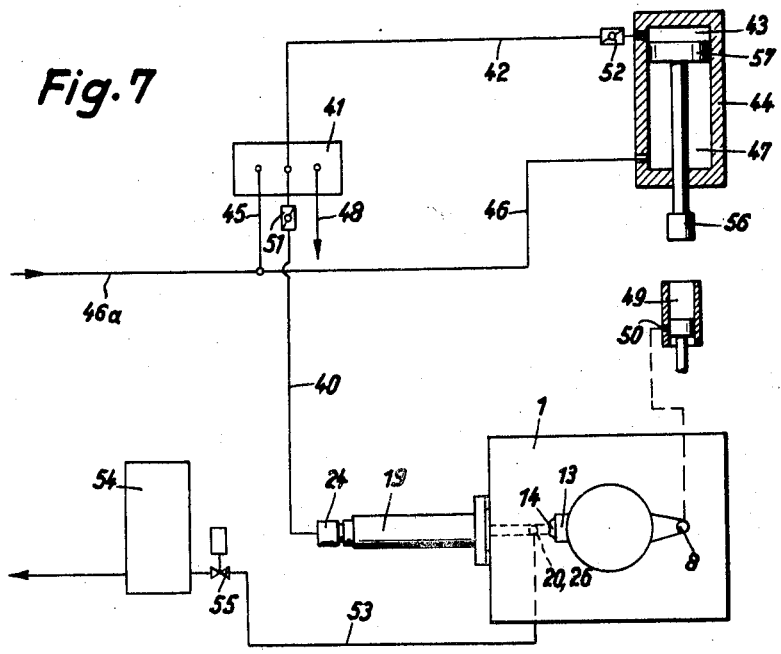
FIG. 7 is a schematic illustration of a hydraulic installation of one type which cooperates with the structure of the invention.
Figure 8:
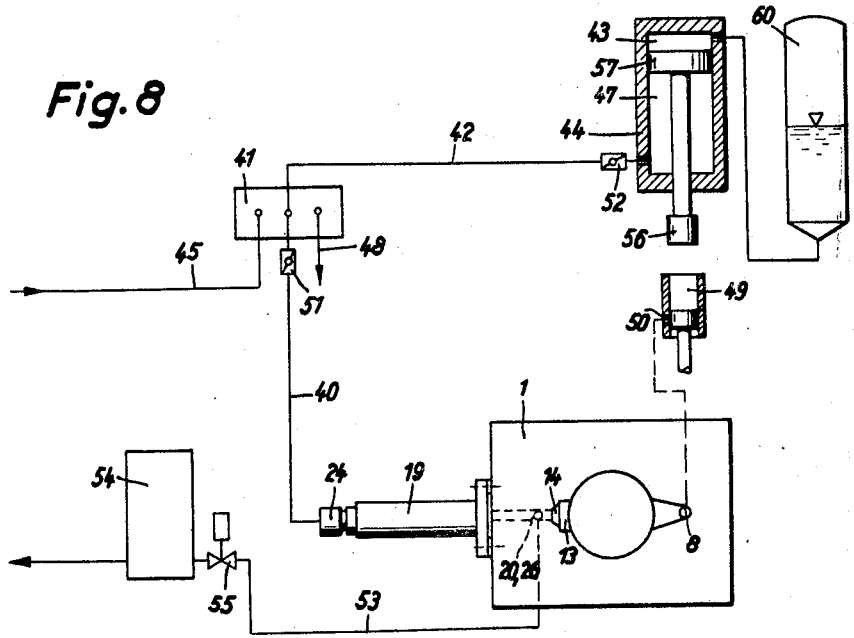

FIG. 7a diagrammatically illustrates a control valve structure of FIG. 7;

FIG. 7b diagrammatically illustrates structure for electrically controlling a valve of FIG. 7;

FIG. 7c shows part of the structure of FIG. 7b in a different position;

FIG. 8 is a schematic illustration of another type of hydraulic installation shown cooperating with the structure of the invention;

FIG. 8a diagrammatically illustrates the details of a control valve of FIG. 8; and FIG. 9 is a fragmentary sectional elevational view of still another embodiment of a structure according to the present invention.

Figure 1:
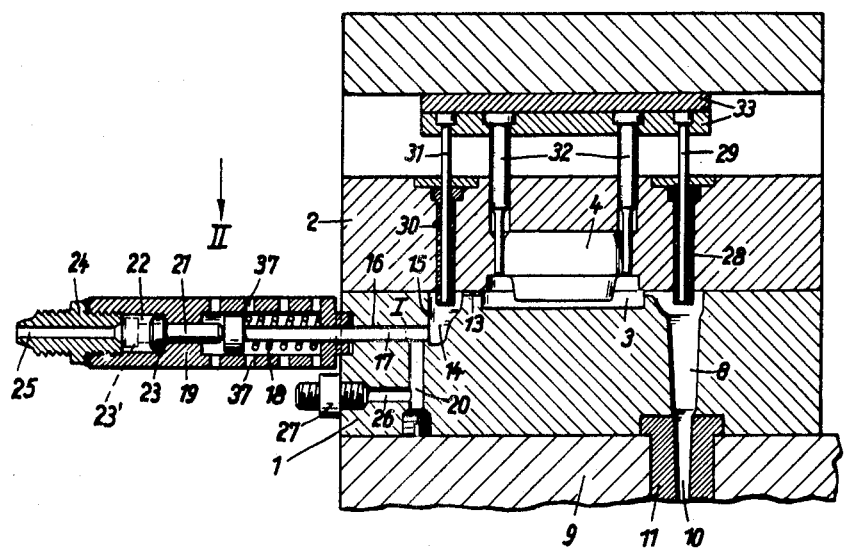
FIG. 1 is a fragmentary sectional elevational view showing a mold provided with the structure of the invention.

In all embodiments of the invention the mold is made up of a lower stationary mold member 1 and an upper movable mold member 2 adapted to be moved upwardly away from the lower mold member 1 in order to remove the casting from the mold. Both of the mold members 1 and 2 define between themselves the mold cavity 3 which is the cavity in which the molten metal or other mold material takes the desired shape. In the embodiments of FIGS. 1–4, the upper movable mold member 2 carries a core 4, and only one core 4 is provided in the embodiment of FIGS. 1 and 2 while a plurality of cores 4 are present in the embodiment of FIGS. 3 and 4, this latter embodiment also including a plurality of mold cavities 3. This mold cavity 3 is in communication with a charging passage 8 formed in the lower mold member 1, the molten molding material flowing upwardly through the passage 8 into the cavity 3. Referring to FIG. 1, the body 9 of the molding apparatus is provided with an unillustrated pressure chamber from which the molten mold material flows through the nozzle bore 10 of the nozzle 11 into the charging passage 8.

The stationary mold member 1 is formed in the illustrated examples with a suction or overflow mold cavity 14, and at the interface between the mold members 1 and 2 the mold member 1 is formed with an overflow passage 13 or with a plurality of such passages providing communication between the cavities 3 and 14. The mold member 1 is formed with a first passage 16 extending through a wall portion of the mold and communicating with the cavity 14, this passage 16 terminating at its right end, as viewed in FIGS. 1 and 3, at the inner surface portion 15 of the mold which defines part of the cavity 14. The axis of the bore 16 extends in the illustrated examples at a right angle to the upward direction of movement of the mold member 2 when the mold is opened. However, it is possible with other types of molds to provide a passage 16 which extends in any other desired direction with respect to the direction of opening movement of the mold. For purposes of ease of manufacture, the passage 16 is preferably cylindrical and a cylindrical plunger 17 is axially slidable along the passage 16. This plunger 17 extends through the passage 16 and outwardly beyond the mold to the exterior thereof where a spring means 18 cooperates with the plunger to urge the latter outwardly of the mold cavity 14. The spring means 18 is in the form of a coil spring located in the hollow right portion of a cylinder 19 which is fixed to the mold member 1, this spring 18 engaging with its right end, as viewed in FIG. 1, the right end wall of the cylinder 19 which is fixed directly to the mold member 1 and with its left end an enlarged head located at the left free end of the plunger 17, as viewed in FIG. 1.

A second passage 20 is formed in the mold member 1 and communicates with the passage 16 at a portion thereof spaced from the inner surface portion 15 of the mold, and the spring 18 urges the plunger 17 in the embodiment of FIGS. 1–4 to the left to a position where the right end of the plunger 17 is located to the left of the junction between the passages 16 and 20, so that at this time the cavity 14 can communicate freely with the passage 20 through the passage 16.

A hydraulic means is provided for acting on the plunger 17 in opposition to the spring means 18 so as to urge the plunger 17 to the right to the position thereof shown in FIG. 1, and this hydraulic means is made up in part of the left portion of the cylinder 19, as viewed in FIG. 1, this left portion of the cylinder 19 providing a cylindrical chamber 22 adapted to receive hydraulic fluid under pressure and housing a piston 23 for axial movement therein, the piston 23 being fixed to a piston rod 21 which slides fluid-tightly through an axial bore of the cylinder 19 into the chamber thereof which houses the spring 18, and the right free end of the piston rod 21 abuts against the left, head end of the plunger 17 so that when hydraulic fluid under pressure is introduced into the chamber 22, the piston 23 will be moved from the dot-dash line position thereof shown at 23' in FIG. 1 to the solid line position in order to advance the plunger 17 to the right, as viewed in FIG. 1, in opposition to the spring 18, to the closed position of the plunger 17 which is illustrated in FIG. 1. The plunger 17 is shown in its open position in FIG. 3. The right end of the chamber 22, as viewed in FIG. 1, limits the movement of the piston rod 21 and the plunger 17 therewith to the right, as viewed in FIG. 1. The left end of the cylinder 19, as viewed in FIG. 1, is fluid-tightly closed by a nipple 24 having a bore 25 and adapted to be placed in communication with the hydraulic system of the molding machine, so that the hydraulic fluid will flow through the bore 25 into and out of the chamber 22.

The passage 20 communicates with the passage 16 at a portion thereof located adjacent to but spaced from the inner surface portion 15 of the mold member 1, and this passage 20 communicates with another passage 26 which is formed in the mold 1. A nipple 27 is threadedly carried by the mold member 1 and communicates with the passage 26, and this nipple 27 is adapted to be placed in communication with a vacuum pump or with a previously evacuated container of large volume, so that when the plunger 17 is in its open position as shown in FIG. 3 the cavity 14 can communicate with a source of vacuum through the right part of the passage 16, as viewed in FIGS. 1 and 3, and through the passage 20, 26, and since the mold cavity 3 communicates through the channel 13 with the mold cavity 14, the mold cavity 3 is also evacuated in this manner.

Referring now to FIG. 1, it will be seen that the upper mold member 2 carries a pair of sleeves or pulling means 28 and 30 which extend downwardly beyond the mold member 2 respectively into the charging passage 8 and the cavity 14, so that when the mold material hardens in the passage 8 and the cavity 14 it will shrink onto the lower free ends of the sleeves 28 and 30 which extend downwardly beyond the mold member 2 so that when the latter is raised the hardened mold material will be carried up with the mold member 2. A pair of ejector rods 29 and 31 are axially slidable within the sleeves 28 and 30, respectively. The ejector rods 29 and 31 as well as additional ejector rods 32 which are distributed about the core member 4 which is carried by the mold member 2 are all carried by a pair of plates 33 in the manner illustrated in FIG. 1.

Figure 2:
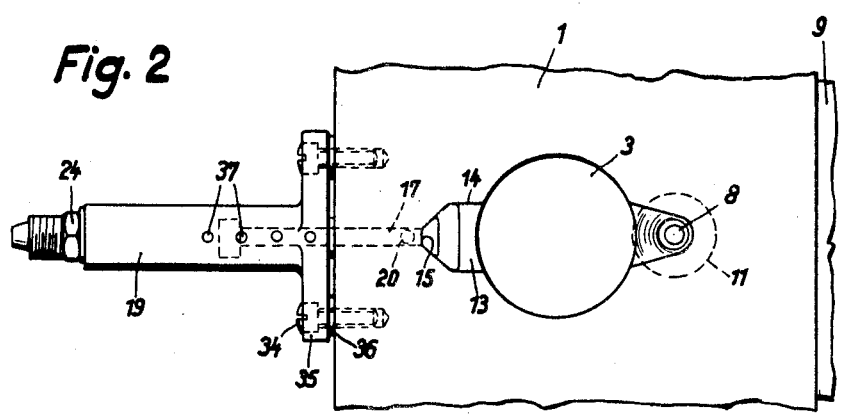
FIG. 2 is a top plan view of the lower portion of the mold of FIG. 1 as seen in the direction of arrow II of FIG. 1.

As may be seen from FIG. 2, the cylinder 19 is provided adjacent the mold member 1 with a pair of bored extensions through which the screw members 34 pass into threaded engagement with the mold member 1, and the right end 35 of the cylinder 19 is maintained out of direct engagement with the mold member 1 by a pair of washers located between the mold member 1 and the flange 35 of the cylinder 19 and through which the screw members 34 respectively pass. In this way there is only a small area of contact provided by the washer 36 and the mold member 1, so that the transfer of heat from the mold to the cylinder 19 is reduced to a minimum. Moreover, the portion of the cylinder 19 which houses the spring 18 is formed with a large number of bores 37 to place the interior of the right portion of the cylinder 19, as viewed in FIG. 1, in communication with the outer atmosphere so that the relatively small amount of heat which is transferred to the cylinder will easily move out to the outer atmosphere through the apertures 37.

Figure 3:
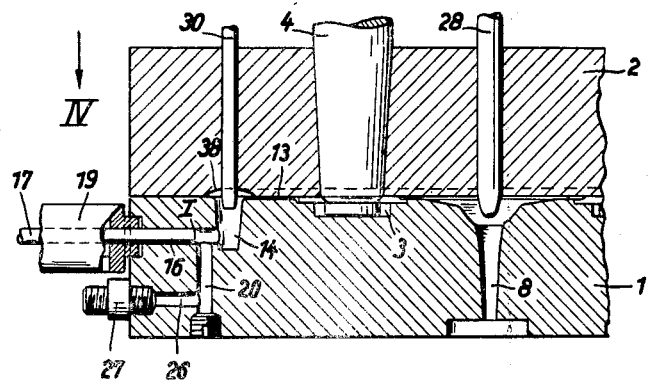
FIG. 3 is a fragmentary sectional elevational view of another embodiment of a mold provided with the structure of the invention.
Figure 4:
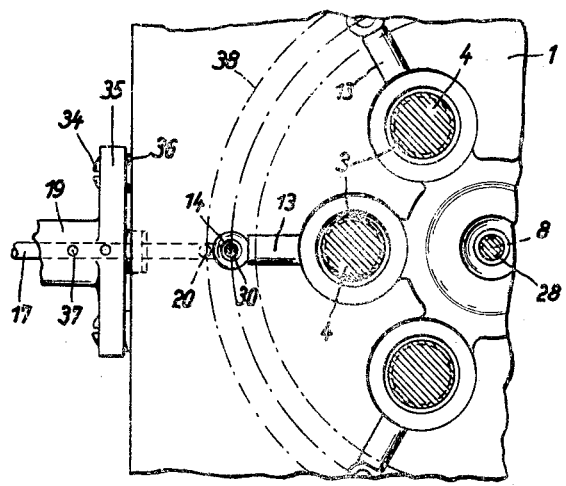
FIG. 4 is a fragmentary top plan view of the lower mold member of FIG. 3 as seen in the direction of the arrow IV of FIG. 3.

In the embodiment of the invention which is illustrated in FIGS. 3 and 4, the mold which is provided with the structure of the invention is formed with a plurality of mold cavities 3 each of which has a core 4 extending into the same, and the mold cavities and cores are circumferentially distributed about the charging passage 8. All of the channels 13 of this embodiment communicate with a common circular groove 38 formed in the lower face of the upper mold member 2, and this groove 38 forms the upper surface of the suction cavity 14 of this embodiment, so that all of the mold cavities 3 communicate through the channels 13 and the common circular groove 38 with the single suction cavity 14. The structure which communicates with and cooperates with the suction cavity 14 of FIGS. 3 and 4 is the same as that of FIGS. 1 and 2.

Upon openings of the mold of FIGS. 3 and 4, the several cores 4 are drawn upwardly through the mold member 2 so as to become separated from the hardened mold material previously cast in the cavities 3. The elements 28 and 30 of this embodiment are not in the form of sleeves. They are in the form of simple rods whose free ends extend into the molten mold material, so that when the latter material hardens it shrinks onto the bottom free ends of the rods 28 and 30 of this embodiment. Upon opening of the mold, the rods 28 and 30 are moved upwardly together with the core members 4 with respect to the upper mold member 2, so that in this way the casting is separated from and is readily removable from the mold.

FIGS. 3 and 4 illustrate how it is possible to place all of the cavities 3 in communication with a common suction cavity 14 through the use of the circular groove 38. It should be noted that the groove 38 need not be circular. It can have other configurations in correspondence with the arrangement of the plurality of mold cavities in the mold. Furthermore, where the mold is provided with a relatively long series of mold cavities or with mold cavities which in themselves are of considerable length, it is possible to provide a plurality of suction cavities 14 each cooperating and communicating with the structure of the invention for evacuating the same.

In the above-described examples the suction cavity 14 is located in the stationary mold member 1. This is the simplest arrangement. However, in accordance with requirements of different installations, it is of course possible to provide one or more suction cavities in the movable mold member 2. In this latter event, it is only necessary to provide a conduit leading to the cylinder 19 which is capable of moving with the latter, since in this case the cylinder 19 would be connected to and would move with the upper mold member 2. For example, suitable telescoped conduits, pivotable conduits, or the like may be connected with the nipple 24 in such an arrangement.

Referring now to FIG. 7, there is shown therein in a schematic manner a hydraulic installation which includes the structure of the invention described above. The nipple 24 communicates through a conduit 40 with the main hydraulic control 41 which may be in the form of a suitable multi-way valve. The conduit 40 communicates with a chamber of the control 41 which also communicates with the conduit 42, so that the conduits 40 and 42 communicate with a common chamber of the control 41, and this conduit 42 leads to the upper pressure chamber 43 of a cylinder 44 which forms a hydraulic means for controlling the charging of the molten material into the mold. The main control 41 communicates through a conduit 45 with a conduit 46 which leads the hydraulic fluid under pressure to the conduit 45 from any suitable source of fluid under pressure such as a pressure accumulator, a pressure pump, or the like. The hydraulic means for controlling the charging of the molten material into the mold is provided in the cylinder 44 thereof with a chamber 47 located beneath the piston 57, and this chamber 47 communicates through the conduit 46 directly with the conduit 45 as well as with the source of fluid under pressure through the conduit portion 46a. A conduit 48 leads from the main control 41 back to the pump or to the reservoir from which the pump draws the fluid. As is schematically shown in FIG. 7, the charging passage 8 receives the molten metal from a reservoir 49 into which a sufficient amount of molten molding material is poured before the operations are started. The reservoir 49 is formed with an opening 50 which communicates with the charging passage 8 which is formed in the lower mold member 1. Suitable throttling elements 51 and 52 are respectively located in the conduits 40 and 42. The nipple 27 located at the end of the passage 26 communicates through a conduit 53 with a suction pump or with a previously evacuated container 54 of large volume, and a valve 55 is located in the conduit 53 just ahead of the evacuated container 54 so that this valve 55 may be mechanically or electrically controlled so as to be opened at a predetermined time interval before the downward movement of the piston 57 and the piston portion 56 therewith, this piston portion 56 moving downwardly along the reservoir 49 so as to cause the molten material therein to flow under pressure along the charging passage 8 into the mold cavities.

After the upper mold member 2 has been located against the lower mold member 1 so as to close the mold, a suitable conventional mold closing mechanism being included in the casting machine for this purpose, the valve 55 is automatically opened through any suitable mechanical or electrical transmission which actuates the valve 55 to open the latter upon closing of the mold. The opening of the valve 55 places the conduit 53 together with the passage 26, 20 and the passage 16 as well as the suction cavity 14 at the same pressure as the vacuum in the container 54. The channel 13 has such a large cross section that the pressure in the mold cavity 3 is practically the same as that in the container 54. As is conventional, the opening 50 of the reservoir 59 is maintained closed at this time by a suitable piston member which is axially slidable in the reservoir 49 from the closing position shown in FIG. 7 downwardly to a position opening the opening 50, and this opening 50 is automatically controlled in a known way so as to be uncovered at the proper time. Inasmuch as the opening 50 is fluid-tightly closed at this time, the interior of the mold cannot communicate with the outer atmosphere through the charging passage 8. Also, since the upper mold member 2 is pressed downwardly against the lower mold member 1 with substantial pressure, the interface between the mold members 1 and 2 is also practically fluid-tight. The amount of air which can flow along the ejector rods or along the axially movable cores is so small that with a proper size of the vacuum pump and of the chamber 54, it is possible to easily provide and maintain a high vacuum in the interior of the mold.

At this time the hydraulic fluid under pressure is not applied to the hydraulic means formed by the left end of the cylinder 19 and the piston 23 therein, since the chamber 22 is connected at this time with the chamber of the control 41 which is common to the conduits 40 and 42, and the hydraulic fluid under pressure has not yet been applied to the hydraulic means 44, 57 to cause the element 56 to start to press molten material out of the reservoir 49. Therefore, at this time the spring 18 acts to maintain the piston 23 in the position 23' shown in FIG. 1, and in this position the piston 23 engages the right end of the nipple 24, as viewed in FIG. 1. At this time the right end of the plunger 17, as viewed in FIGS. 1 and 3 is located at the position I indicated in FIGS. 1 and 3, to the left of the junction between the passages 16 and 20, as viewed in FIGS. 1 and 3, so that the cavity 4 communicates freely through the passage 16 with the passage 20, 26. At this time the lower chamber 47 of the cylinder 44 beneath the piston 57 thereof communicates with the hydraulic fluid under pressure through the conduit 46, so that the piston 57 is maintained in the elevated position illustrated in FIG. 7 thus preventing the charging of the molten material into the mold.

Immediately after the mold is closed and as soon as the mold cavities have been evacuated in the above described manner, the necessary amount of molten material is placed in the reservoir 49 and the control 41 is then actuated in known, unillustrated manner, so that the chamber of the control 41 which is common to conduit 40 and 42 now receives hydraulic fluid under pressure. Therefore, the hydraulic fluid under pressure is applied to the hydraulic means shown at the upper right of FIG. 7 in a manner which causes the hydraulic fluid under pressure to enter into the chamber 43, and because of the larger area of the upper face of the piston 57 as compared to its lower face, the piston 57 will be moved downwardly at this time to cause the member 56 to enter into the reservoir 49 to start the charging of the molten material into the mold. Simultaneously with the flow of hydraulic fluid under pressure through the conduit 42 to the chamber 43, the hydraulic fluid under pressure also flows through the conduit 40 into the chamber 22 in order to advance the piston 23 to the right to the position thereof shown in FIG. 1, and thus the plunger 17 is advanced to the right as viewed in FIG. 1, against the force of the spring 18 to the position shown in FIG. 1.

The axial position of the plunger 17 is determined by the engagement of the piston 23 with the right end of the chamber 22, and the parts are so designed that when the plunger 17 is in the closed position thereof shown in FIG. 1, the right end face of the plunger 17 is perfectly flush with the inner surface portion 15 of the mold, and at the same time the passage 16 is fluid-tightly closed at the face 15 of the cavity 14, so that it is impossible for any molten mold material to flow into the passage 16. By providing an arrangement where the right end face of the plunger 17 is perfectly flush with and forms a continuation of the inner surface portion 15 of the mold when the plunger 17 is in its closed position shown in FIG. 1, there is absolutely no difficulty involved in the removal of the hardened mold material from the cavity 14, since the right end portion of the plunger 17 is located out of the path of movement of the hardened mold material out of the cavity 14 when the plunger 17 is in a closed position thereof shown in FIG. 1. Since the pair of hydraulic means which actuate the piston 23 and the piston 57 are simultaneously provided with fluid under pressure, they are actuated simultaneously and consequently the closing off of the communication between the passages 16 and 20 takes place simultaneously with the start of the operation of the piston 57, so that when the molten material flows into the mold the communication between the cavities thereof with the source of vacuum is already cut-off. Thus, the molten mold material which flows from the cavity 3 through the channel 13 into the cavity 14 cannot flow beyond the cavity 14, and the molten material hardens in the cavity 14 in the same way as in the cavity 3 and in the charging passage 8. As was pointed out above, the hardened material shrinks onto the sleeves 28 and 30. Also, the material shrinks onto the core 4. After the opening of the mold, the plates 33 are moved in a known way so that the ejector rods 29 and 31 as well as the ejector rods 32 strip the casting from the sleeves 28 and 30 as well as core 4, and in this way the entire casting is separated from the mold.

Of course, the same operation takes place with the embodiment of FIGS. 3 and 4 through simultaneous upward movement of the ejector rods 28 and 30 and the core members 4 with respect to the mold member 2.

The opening of the mold causes the valve 55 to become closed again in an automatic manner, and the fluid under pressure stops flowing through the conduits 40 and 42 so that the piston 57 returns to its starting position. The spring 18 returns the plunger 17 to its open position so that the cavity 14 can again communicate with the source of vacuum during the next operation. The subsequent closing of the mold again opens the valve 55 so as to evacuate the mold cavities in the above described manner, and just before the metal is introduced under pressure into the mold cavities the suction cavity 14 is again closed by the plunger 17 so that the mold cavity 14 no longer communicates with the suction conduit 53 and no molten mold material can flow into the passage 16.

The pair of throttling devices 51 and 52 are capable of being adjusted so as to very accurately control the relationship between the operation of the piston 57 and the plunger 17, and the devices 51 and 52 are adjusted so that the plunger 17 reaches its closed position just before the cavity 3 becomes filled with the molten mold material, and in this way the vacuum which is in the interior of the mold upon closing of the passage 16 at its right end by the plunger 17 cannot be disturbed by any leaks to the outer atmosphere.

Figure 5:
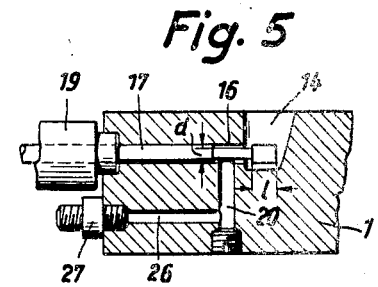
FIG. 5 is a fragmentary sectional elevational view showing another embodiment of a structure of the invention, this structure being shown in FIG. 5 in the position where the mold cavity freely communicates with a source of vacuum.
Figure 6:
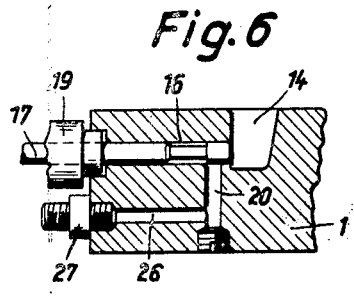
FIG. 6 shows the structure of FIG. 5 after the parts have taken a position where the mold cavity is closed off from the source of vacuum.

In another type of hydraulic installation, the piston 57 is not actuated by fluid pressure, from above, and the actuation takes place by the elimination of the pressure in the fluid in the chamber 47 beneath the piston 57. Such a hydraulic installation shown in FIG. 8. Thus, in this case the member 56 which cooperates with the reservoir 49 to charge the molten material into the mold, is operated by fluid under pressure derived from a pressure accumulator 60 which communicates with the chamber 43 above the piston 57. In this type of installation, the conduit 42 leads to the chamber 47 rather than the chamber 43, and during the molding operation the chamber 47 of the cylinder 44 and thus the pressure chamber 22 of the cylinder 19 are both simultaneously released of pressure. Therefore, with this type of installation it is necessary to control the plunger 17 so that it will close the suction cavity 14 when there is no pressure in the chamber 22 of the cylinder 19, and for this purpose the plunger 17 has the construction shown in FIGS. 5 and 6. Referring to FIG. 5, it will be seen that at a distance $l$ from the right end face of the plunger 17, the latter is formed with an axial cutout in the form of an annular groove providing the plunger 17 with a portion of a reduced diameter $d$. Any other suitable axial cutout may be formed in the plunger 17 so as to provide free communication between the cavity 14 and the passage 20 through the passage 16 when the plunger 17 is in the open position thereof shown in FIG. 5. This is the position which the structure of FIG. 5 takes when the mold is closed and when the piston 57 is in its upper position shown in FIG. 8 maintaining the member 56 out of the reservoir 49. The chamber 22 of the cylinder 19 is under pressure at this time so that the piston rod 21 maintains the plunger 17 in the position illustrated in FIG. 5 permitting the mold cavities to be evacuated. As soon as the reservoir 49 has been charged with the necessary amount of molten material, the control 41 is actuated so as to stop the flow of fluid under pressure to the conduits 40 and 42, and therefore at this time the spring 18 is free to shift the plunger 17 to the left to the position shown in FIG. 6 where the right end face of the plunger 17 closes the passage 16 in the same way as described above in connection with FIGS. 1 and 3, the right end face of the plunger 17 also being flush with the inner surface of the cavity 14 with this embodiment. The simultaneous release of pressure from the chamber 22 and the chamber 47 causes the spring 18 to act simultaneously with the commencing of the downward movement of the piston 67 of FIG. 8, and thus immediately after the passage 16 is fluid-tightly closed at its right end, as viewed in FIGS. 5 and 6, the molten mold material reaches the interior of the mold, the opening 50 of the reservoir 49 being automatically uncovered at the proper time with the embodiment of FIG. 8 as well as with the embodiment of FIG. 7 in an automatic well known manner not forming part of the present invention. It will be noted from a comparison of FIGS. 5 and 6 that the length *l* of the right end portion of the plunger 17 which closes the passage 16 at the cavity 14 in the position shown in FIG. 6 is long enough to close the top end of the passage 20. The valve 55 of FIG. 8 is actuated in the same way as the valve 55 of FIG. 7. Thus, this valve 55 is opened upon closing of the mold and closed upon opening of the mold.

The details of the control 41 are illustrated in FIG. 7a for the embodiment of FIG. 7. Referring now to FIG. 7a, it will be seen that the valve 41 includes a pair of valve members *a* and *b* respectively located on opposite sides of a pivot *e* which turnably supports a lever *c* for tilting movement about the axis of the pivot *e*, this lever *c* being operatively connected with the valve stems *f* and *g* of the valves *a* and *b*, respectively. Springs *h* and *i* respectively urge the valves *a* and *b* to their closed positions, and a spring *d* urges the lever *c* to a rest position where the stem *g* is at a higher elevation than the stem *f* to maintain the valve *b* open.

When the lever *c* is turned by the operator in a clockwise direction, as shown by the arrow in FIG. 7a, in opposition to the spring *d*, the valve *a* is opened and the valve *b* closed. Thus, the fluid under pressure in the lines 46a and 45 flows through the open valve *a* into the conduits 42 and 40. From the conduit 42 the fluid under pressure reaches the pressure chamber 43. When the lever *c* is released so that the spring *d* opens the valve *b* and allows the valve *a* to be closed by the spring *h*, the conduits 40 and 42 communicate through the valve *b* with the low pressure conduit 48 leading back to the fluid reservoir, for example.

FIG. 8a shows the construction of the control 41 of FIG. 8. As may be seen from FIG. 8a, when th operator depresses the lever *c* in opposition to the spring *d* in a counterclockwise direction, as viewed in FIG. 8a, the valve *b* will open and the valve *a* will close so that the chamber 47 beneath the piston 57 will be relieved of pressure, while when the lever *c* is released the spring *d* will return the parts to the rest position where the valve *a* is open and the valve *b* closed, and in this position the fluid under pressure will flow simultaneously to the conduits 40 and 42. At this time the fluid under pressure in the chamber 47 will maintain the piston 57 in its raised position.

Of course, the fluid flowing from conduit 45 through valve *a* and conduit 42 into chamber 47 has a higher pressure than the fluid in the pressure accumulator 60.

FIG. 7b shows how the valve 55 is operated. When the movable mold member 2 is located against the stationary mold member 1 to close the mold, a projection fixed to the movable member 2 closes the normally open switch 55d so as to energize the solenoid made up of the coil 55c and armature 55b. This armature is fixed to the valve stem of the valve member 55a of valve 55, the spring 55e moving valve member 55a to its closed position when the solenoid is not energized. Energizing of the coil 55c causes the armature 55b to move downwardly, as viewed in FIG. 7b for opening the valve 55 and thus the conduit 53 is automatically placed into engagement with the vacuum chamber 54 upon closing of the mold. When the mold is open the switch operating member fixed to the movable mold member 2 moves away from the switch 55b to the position shown in FIG. 7c so that the switch 55d automatically opens to deenergize the solenoid so that spring 55e automatically moves valve member 55a to its closed position.

Of course, the structure shown in the embodiments of FIGS. 1–8 may be varied, for example, by providing a passage 16 which communicates directly with the cavity 3 so that the end portion of the plunger 17 cooperates directly with the mold cavity 3, and in such a construction the channels 13 and suction cavities 14 would eliminated. In all cases where it is possible to arra the passage 16 so that it communicates directly with mold cavity 3 in which the mold material is formed i the desired configuration, there is, therefore, a consic able simplification of the structure.

The above-described embodiments do not repres all possible structures included in the concept of the vention. Small details can of course be changed in a desired way. Thu, it is particularly possible to use second hydraulic piston in the cylinder 19 which repla the spring 18 and whose movement is controlled au matically by the hydraulic control structure so that plunger 17 moves at the desired moment in the cast process.

The structure of the invention can also be used in ca ing machines where the reservoir 49 is not of the ty which has its connection with the mold closed eitl mechanically or by the molten material itself. It possible to use the structure of the invention with tl type of machine where the mold material such as, example, molten metal, is sucked into the reservoir the desired amount, the mold cavities, the charging p sages for the mold, and the reservoir itself all bei evacuated in a machine of this type. After the desii amount of molten material has been sucked into t reservoir, then this material is pressed out of the lat into the mold at the desired pressure in the manner c scribed above, and the mold is placed into and out communication with the reservoir also in the above-c scribed manner. The mold and the reservoir connect thereto are completely closed off from the outer atm( phere so that it is easy to obtain a relatively great vacuu FIG. 9 shows an embodiment of the invention whe the inner surface portion of the mold at the sucti cavity 14 at which the passage 16 terminates is eith sharply inclined or curved. With such an inner surfa it is not advisable to shape the right end face of t plunger 17 so that it is exactly flush with and forms continuation of this inner surface. If such a constru tion were used in this case, then the plunger would ha at the region A shown in FIG. 9 an end tip of very sm thickness which would have only a limited life. As m be seen from FIG. 9, the right end face of the plung 17 is flat so that it does not include any tip which fi the region A and this region A is therefore empty ar becomes filled with the metal or other mold materi; Moreover, it will be seen that at the right end portion the plunger which closes the passage 16, the plunger h an upper portion B in FIG. 9 which extends into the mo cavity 14. Therefore, even in the case of an inner mo surface as shown in FIG. 9, the plunger 17 is provid( with a robust construction which will have a long lif In spite of the fact that the free end of the plunger 1 is not flush with the surface of the mold cavity as inc cated in FIG. 9 it will be seen that the plunger is n located at any point in the path of movement of tl hardened mold material out of the cavity 14 and it therefore seen that it is not essential to provide tl plunger 17 with an end face which will be flush with tl surface of the mold cavity when the passage 16 is close As long as no part of the plunger 17 is located in tl path of movement of the mold material out of the cavit then the fact that the plunger does not have an end fac flush with the surface of the mold cavity is immateria In the embodiment of FIGS. 1, 3, 5 and 6, the surfac 15 of the mold cavity has a suitable draft permitting eas withdrawal of the hardened mold material, and the en face of the plunger 17 is inclined to the same extent a the surface 15 so as to be perfectly flush therewith.

It will be understood that each of the elements describe above, or two or more together, may also find a usefi application in other types of casting apparatus differin from the types described above.

While the invention has been illustrated and described as embodied in structure for providing a vacuum in casting apparatus, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a molding apparatus, in combination, a mold formed with a mold cavity and an overflow cavity communicating by overflow passage means with said mold cavity at an overflow region of the latter; charging passage means communicating with said mold cavity in a region thereof substantially spaced from said overflow passage means for feeding molding material in said mold cavity; exhaust passage means communicating with said overflow cavity at an inner surface portion transversely spaced from said overflow passage means; means cooperating with said exhaust passage means for evacuating the latter so that said cavities are also evacuated through said exhaust passage means; a plunger movable along said exhaust passage means to and from a closed position where said plunger completely closes said exhaust passage means at said inner surface portion of said overflow cavity, said plunger having an end portion which closes said exhaust passage means entirely at said inner surface portion when said plunger is in its closed position and said end portion of said plunger being located out of the path of movement of hardened molding material out of said cavities, so that molten molding material cannot flow into said exhaust passage means after the latter is closed by said plunger and so that said plunger does not interfere with the removal of hardened molding material from said cavities; and pulling means having an end portion extending into said overflow cavity about which the molding material will shrink after hardening for pulling the hardened molded material out of said overflow cavity.

2. In a molding apparatus, in combination, a mold formed with a mold cavity, a charging passage leading to said mold cavity, an overflow cavity, a connecting passage spaced from said charging passage and connecting a portion of said mold cavity with said overflow cavity, and a first exhaust passage communicating with said overflow cavity at a portion thereof spaced from said connecting passage, said first exhaust passage terminating at an inner portion of said overflow cavity, said mold being also formed with a second exhaust passage communicating with said first exhaust passage at a part thereof spaced from said inner surface portion, said second exhaust passage being adapted to be placed in communication with a source of a vacuum; and a plunger movable axially along said first exhaust passage between an open position where said plunger does not prevent communication of said second exhaust passage with said overflow cavity of the mold through said first exhaust passage and a closed position where an end portion of the plunger completely closes said first exhaust passage at said inner surface portion without being located in the path of movement of mold material out of said overflow cavity after the mold material hardens.

References Cited in the file of this patent

UNITED STATES PATENTS

| | | |
|---|---|---|
| 2,243,835 | Brunner | June 3, 1941 |
| 2,668,985 | Babbitt | Feb. 16, 1954 |
| 2,785,448 | Holder | Mar. 19, 1957 |
| 2,866,240 | Schroeder | Dec. 30, 1958 |